UNITED STATES PATENT OFFICE.

JESSE H. YOUNG, OF FORT WAYNE, INDIANA.

COMPOUND FOR CLEANING AND SOLDERING METALS.

SPECIFICATION forming part of Letters Patent No. 712,230, dated October 28, 1902.

Application filed January 10, 1902. Serial No. 89,123. (No specimens.)

*To all whom it may concern:*

Be it known that I, JESSE H. YOUNG, a citizen of the United States, residing at Fort Wayne, in the county of Allen and State of Indiana, have invented a new and useful Composition of Matter to be Used for Cleaning and Soldering Metals, particularly Jewelry, of which the following is a specification.

My composition consists of the following ingredients combined in the proportions stated, viz: water, distilled, eight ounces; ammonia, one-half ounce; sal-ammoniac, ten grains; potassium cyanid, three ounces.

The above-named composition is intended for use as an "anti-oxidizer" and in making "hard-solder" joints. It also serves as a "pickel" for cleaning metal.

In using my composition for soldering the parts to be joined, together with a piece of suitable solder, are dipped into the fluid or the fluid may be applied, as with a brush. The metal, with the solder in place, is heated gradually until the solder is about to flow, when additional fluid is applied, as with a brush. Heat is then applied until the solder flows and completes the joint. Before the metal has cooled considerably it may be immersed in the fluid, in which event the metal will become cleansed from the usual tarnish and adhering foreign substances due to the soldering process.

In cleaning articles of jewelry the article is immersed in the fluid momentarily and then washed in water. In removing tarnish from such articles as engraved band and chased rings the article may be heated slightly and then immersed in the fluid.

What I claim, and desire to secure by Letters Patent of the United States, is—

1. The herein-described composition of matter, consisting of water, ammonia, sal-ammoniac, and potassium cyanid, for the purpose specified.

2. The herein-described composition of matter for cleaning and preparing metal for soldering, consisting of distilled water eight ounces, ammonia one-half ounce, sal-ammoniac ten grains, and potassium cyanid three ounces, for the purpose specified.

In testimony whereof I affix my signature in presence of two witnesses.

JESSE H. YOUNG.

Witnesses:
   FRANK J. LANG,
   HELEN ROHRBACH.